(No Model.) 3 Sheets—Sheet 1.
W. R. HALLETT.
SULKY HAY RAKE AND TEDDER COMBINED.
No. 360,876. Patented Apr. 12, 1887.
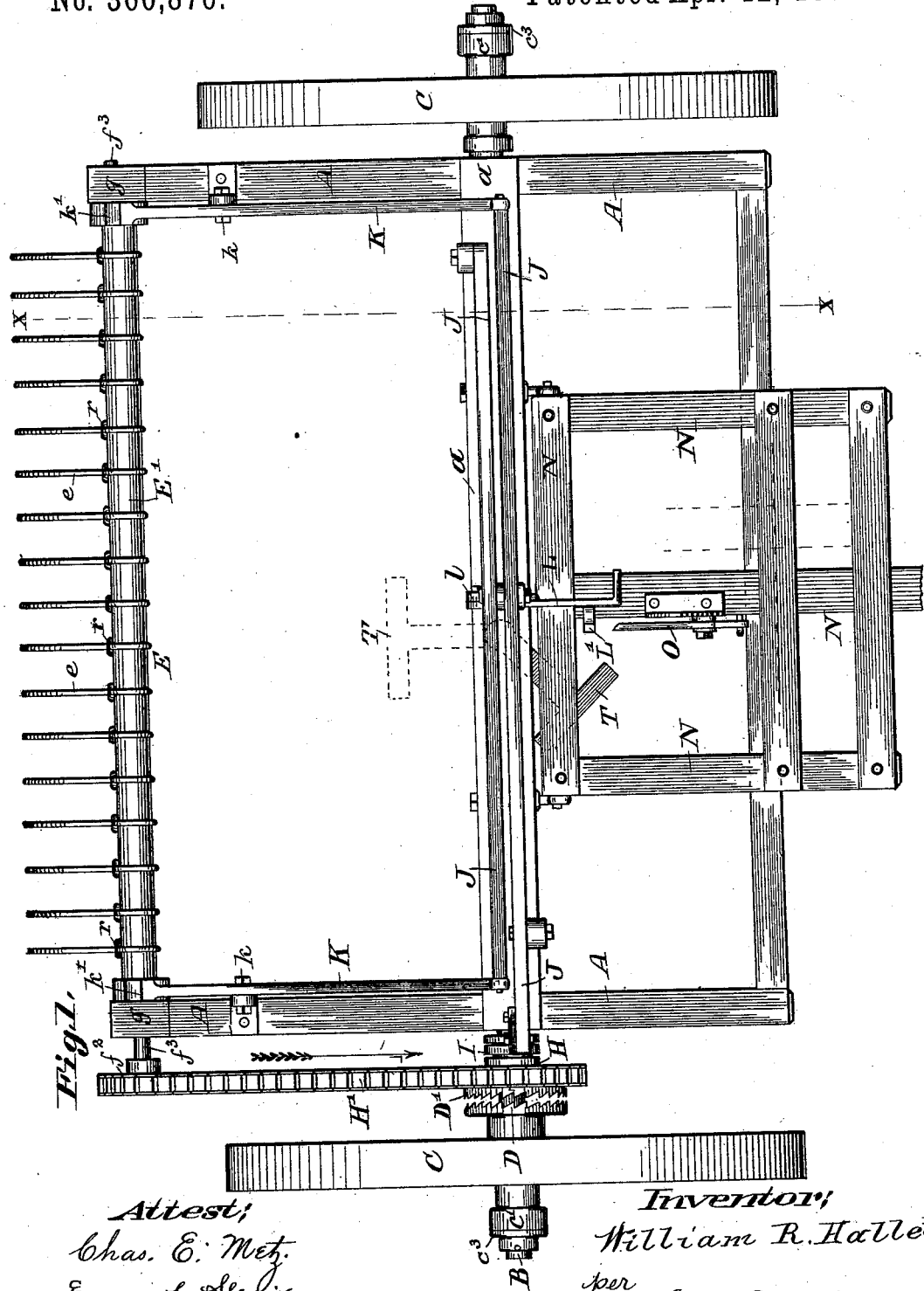
Attest;
Chas. E. Metz.
Eugene C. Slee
Inventor;
William R. Hallett
per Chas. F. Meisner,
Attorney

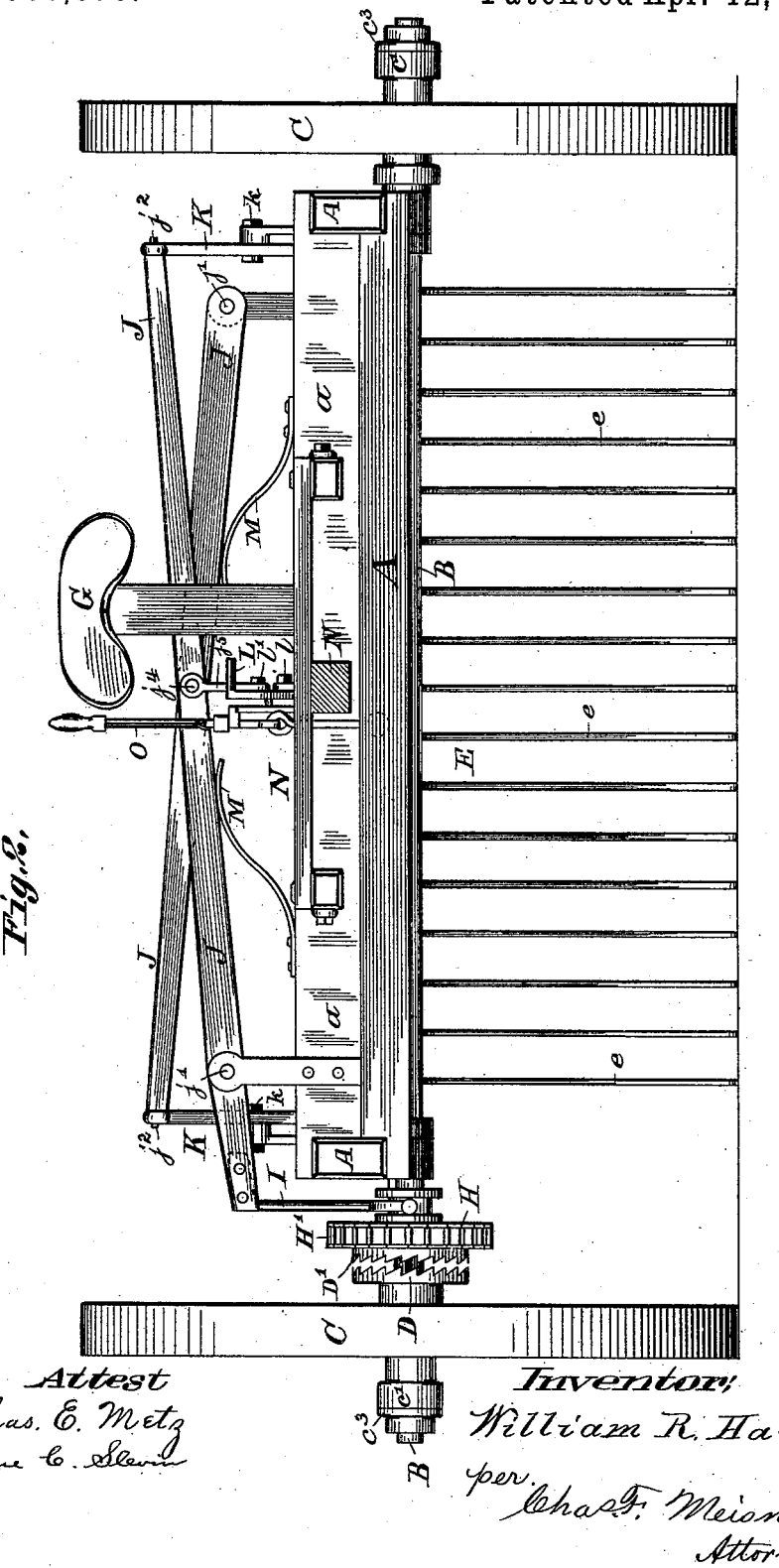

(No Model.) 3 Sheets—Sheet 3.
W. R. HALLETT.
SULKY HAY RAKE AND TEDDER COMBINED.
No. 360,876. Patented Apr. 12, 1887.
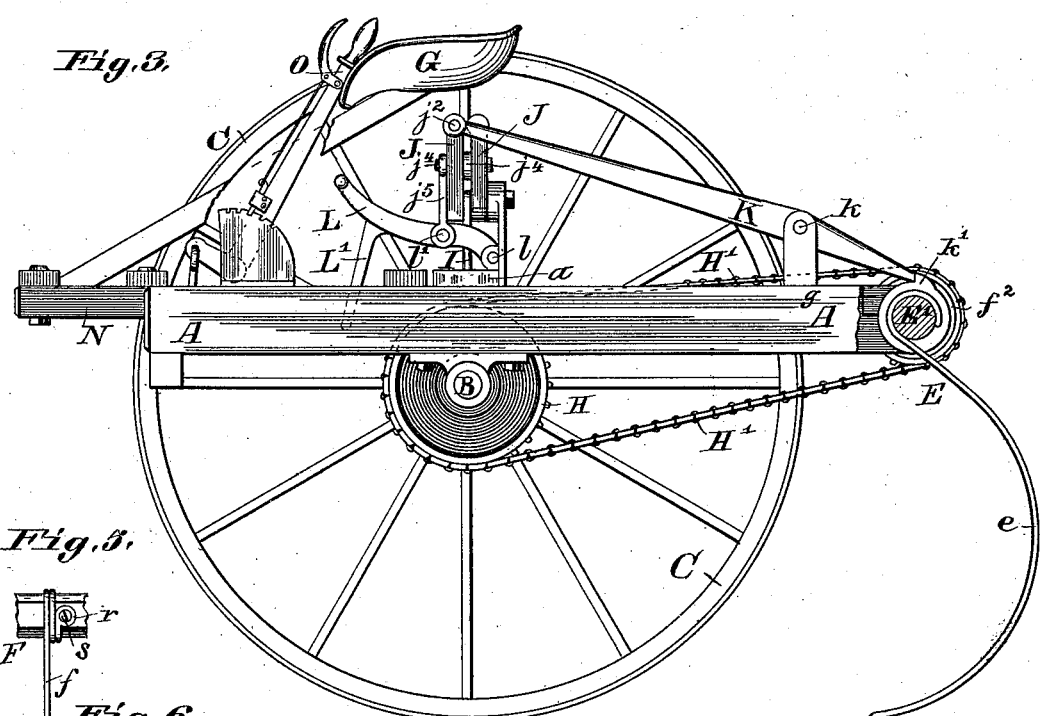
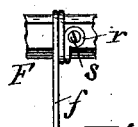
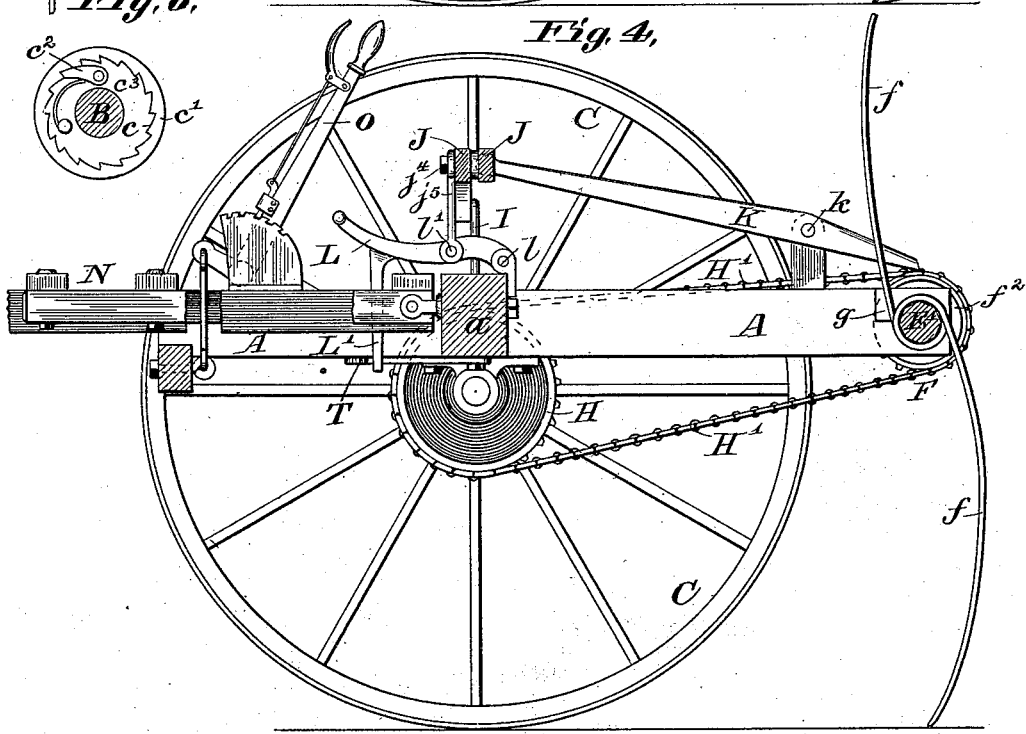
Attest:
Chas. E. Metz
Eugene C. Slevin
Inventor:
William R. Hallett
per Chas. F. Meisner, Attorney

UNITED STATES PATENT OFFICE.

WILLIAM R. HALLETT, OF BATCHTOWN, ILLINOIS, ASSIGNOR OF ONE-HALF TO ALBERT HADLEY, OF SAME PLACE.

SULKY HAY RAKE AND TEDDER COMBINED.

SPECIFICATION forming part of Letters Patent No. 360,876, dated April 12, 1887.

Application filed May 17, 1886. Serial No. 202,478. (No model.)

*To all whom it may concern:*

Be it known that I, WILLIAM R. HALLETT, a citizen of the United States, residing at Batchtown, in the county of Calhoun and State of Illinois, have invented a certain new and useful Improvement in a Sulky Hay Rake and Tedder Combined, of which the following is a specification.

My invention specially relates to horse hay rakes and tedders.

The object of my invention is, first, to make a sulky hay-rake in which the rake-teeth rotate completely over or around at each forming of a windrow, so that the hay will all be left together and in place and a new gathering commenced immediately adjoining the windrow, without liability of scattering the hay in the row just formed, usually caused by the teeth not being fully withdrawn or being dropped too soon, and to cause the rake to complete its rotation while the wheels of the sulky rotate or turn half around or less; second, to construct the rake-carrying frame so that the rake may be readily removed and a tedder substituted for it in the same place, and so that the same operating mechanism which rotates the rake will adapt itself for the same purpose to the tedder, and, third, to afford facilities for the proper adjustment of the rake-teeth and tedder forks or prongs independent of each other on their respective rotating shafts.

The improvements consist, first, in the rake and tedder carrying-frame and its arrangement on the axle and wheels, so that when either the rake or tedder is in position and use it will be far enough in the rear to turn completely over without interfering with the axle of the sulky or any of the operating mechanism on the said frame; second, in the construction and arrangement of the operating mechanism with the driving mechanism for rotating either the rake or tedder; third, in the combination and arrangement of a spring-lever, pawl, and ratchet, all within easy reach and under control of the driver for throwing the driving mechanism into and out of engagement with the rake or tedder, and for locking and unlocking the rake while in use, and, fourth, in the construction of detail parts, all of which will hereinafter fully appear and be claimed.

Of the drawings, Figure 1 is a top plan of the sulky with a rake attachment. Fig. 2 is front elevation of the same. Fig. 3 is a section on line $x$ $x$ of Figs. 1 and 2. Fig. 4 is a section on the same line $x$ $x$ of Figs. 1 and 2, showing a tedder in use. Fig. 5 is a detail view of tedder or rake-tooth, showing its construction. Fig. 6 is a detail view of the pawl and ratchet connection between the hubs of the wheels and axle of the sulky.

Similar letters indicate similar parts in all the several views.

A is the frame of the machine, upon which the operating mechanism is rigged. This frame is supported on an axle, B, of the wheels C of the sulky.

To allow the axle to turn with the wheels as they move forward and to remain stationary when they move backward, any well-known ratchet-connection may be used. The one I prefer to use is shown in Fig. 6, being constructed as follows: The wheels C are provided with ratchet teeth $c$ on the inside of the hub $c'$. Into these teeth $c$ a spring-pawl, $c^2$, of a collar, $c^3$, keyed to the axle, engages when the sulky moves forward, thus causing the axle to move and turn in the same direction, and when backing the sulky the wheels turn without turning the axle.

D D' is a clutch device, the part D being keyed to the axle and turning with it. The part D', however, fits loosely on the axle as a collar, capable of sliding back and forth on the axle for engagement and disengagement with the clutch part D, for communicating the motion to the rake or tedder whenever desired. The frame A extends back beyond the axle far enough to admit of a rake, E, or tedder F, constructed as hereinafter described, to rotate completely over without interfering with the axle, the driver's seat, or any of the mechanism which operates them and controls their movements.

The teeth $e$ of the rake and forks $f$ of the tedder are formed on a wooden cylinder or shaft, E' and F', respectively, both of which are provided with a sprocket-wheel, $f^2$, at one and the same end, and a journal, $f^3$, at each end alike to fit the same bearings, *g*, of the carrying-frame A.

H is a large sprocket-wheel, cast to form part of the clutch part D', and H' is a sprocket-chain, which communicates the rotary motion of the said wheel H to the rake or tedder by passing around the small sprocket-wheel $f^2$.

To throw the clutch part D' into and out of engagement with the keyed part D, to impart the required rotary motion to the rake or tedder, I employ the following means: I is a fork, the lower or forked end of which straddles the loose clutch part D', and the upper end is rigidly secured to the short arm of a lever, J, fulcrumed at *j* to a cross-piece of the frame A. This lever J extends above and across the frame from side to side and parallel with the axle B, passing under the driver's seat C. At the opposite end of the lever J, or the extreme end of its long arm at $j^2$, engagement is made with a pawl, K, extending at right angles from it, said pawl having its fulcrum *k* on the side piece of the frame A, and its pawl end engaging with a ratchet-tooth, *k'*, provided on the shaft of the hay-rake.

L is a foot-lever, preferably hinged with one end, *l*, to the center of the cross-piece *a* of the frame A, as shown in Figs. 3 and 4, so as to bring its other end within easy reach of the operator's foot. At *l'*, about the middle of the foot-lever, connection is made with the lever J at $j^4$ by a link-iron, $j^5$. (See Figs. 2, 3, and 4.) Thus, when the rake is used, a spring, M, underneath the lever J, keeps the pawl K in engagement with the ratchet-tooth *k'* of the rake-shaft while the hay is being raked, to keep the rake from turning. As soon as the rake is filled, the operator presses the foot-lever down, brings the long arm of the lever J down thereby, and disengages the pawl K just previous to throwing the clutch D D' into engagement as the short arm of said cross-lever J is raised, causing the sprocket-wheel H to rotate with the axle, and by means of the sprocket-chain communicating its rotary movement to the smaller sprocket-wheel of the rake-shaft, causing the rake-teeth to lift up and turn completely over at each forming windrow. On releasing the foot-lever, the spring M returns the parts to the original position, disengaging the clutch device and bringing the pawl into engagement with the ratchet-tooth to lock the rake, and holds it firm and rigid while raking or gathering the next lot of hay. This feature of the invention is further elaborated by duplicating the cross-lever J, spring M, pawl K, and ratchet-tooth *k'*, which form the locking mechanism for the rake, thus insuring more positive action, as well as adding strength and durability to said parts. The clutch, however, is not duplicated. The two cross-levers are pivoted together in the center at $j^4$, (see Fig. 2,) to insure simultaneous engagement of both pawls.

When changing the machine from a rake to a tedder, it is but necessary to remove the rake-shaft and substitute for it the tedder-shaft, and to operate it the operator keeps the clutch device in engagement with his foot on the foot-lever; or he may keep it there by means of an iron latch-piece, T, underneath the cross-piece *a* of the frame A, which engages an extension-piece, L', of the foot-lever. This latch-piece T swings horizontally around a pin, which holds it in place, and when not in use is made to assume the position shown in Fig. 1, being to one side, and may also be turned backward to support the rake when the latter is turned up out of use.

As the tedder, when in use, rotates continually, a ratchet-tooth is not required on its shaft.

N is the draft-frame.

O is a vertical hand-lever by which the operator changes the position of the carrier-frame A with relation to the draft-frame, to alter the distance at which the spring-teeth of the rake or the forks of the tedder approach the ground.

The spring-teeth or fork-prongs I make of the shape shown in Figs. 3, 4, and 5, having coiled upper ends and an eye, *r*, formed at the end of the coil, the coil to surround the shaft and the eye to serve for the passage of a screw, *s*, by which to secure the same to the shaft, and so that the teeth or prongs may be arranged or spaced as desired.

What I claim is—

1. A horizontally-pivoted catch, T, in combination with a rotary rake which is supported by said catch when the catch is turned backward and the rake is turned upward out of use, substantially as set forth.

2. A rotary rake, a locking-pawl for said rake, a transverse lever, J, attached to said pawl, and a foot-lever for depressing one end of said transverse lever, to free said pawl from such engagement, in combination with a horizontally-turning catch for locking said foot-lever, said catch also serving, when turned backward, as a support for the rake when the latter is turned upward out of use, substantially as set forth.

WILLIAM R. HALLETT.

Witnesses:
 GEORGE L. ALLERTON,
 HENRY A. HALLETT.